June 12, 1956 — H. A. VAN DUSEN, JR — 2,750,488
SWIVEL MARKER FOR ELEVATED RUNWAY FIXTURES
Filed April 8, 1953 — 2 Sheets-Sheet 1

INVENTOR.
Harold A. Van Dusen, Jr.

June 12, 1956  H. A. VAN DUSEN, JR  2,750,488
SWIVEL MARKER FOR ELEVATED RUNWAY FIXTURES
Filed April 8, 1953  2 Sheets-Sheet 2

INVENTOR.
Harold A. Van Dusen Jr.
BY
Attorney

United States Patent Office 2,750,488
Patented June 12, 1956

2,750,488

SWIVEL MARKER FOR ELEVATED RUNWAY FIXTURES

Harold A. Van Dusen, Jr., South Milwaukee, Wis., assignor to McGraw Electric Company, Milwaukee, Wis., a corporation of Delaware Application April 8, 1953, Serial No. 347,515

3 Claims. (Cl. 240—1.2)

The present invention relates to improvements in a runway marker, more particularly to a marker used in unison with an elevated runway lighting fixture.

Stationary objects, in the vicinity of the path of an aircraft or other vehicle which is in motion, will more efficiently perform their function as guide markers if they can be easily observed by the operator of the vehicle. Obviously the size of an object plays an important part in visibility and, therefore, it is desirable to provide means which will at least present the appearance of a reasonably enlarged guide marker without excessive use of material or increase in cost of producing it.

Various means have been heretofore employed to make a stationary marker more cognizable under daylight conditions. Among these is a conical apron rigidly attached to a vertical supporting column. This apron is extended a considerable distance away from its supporting member to perform its primary function of making the marker more conspicuous. Consequently, the marker is susceptible to being damaged by aircraft, vehicles or snowplows which might strike it. Where the apron is supported rigidly, the material out of which it is made, as well as the supporting member, may be permanently damaged or destroyed. As a result of such damage the apron is no longer effective as a marker and frequently the lighting fixture is rendered useless. Much of the damage described herein can be avoided by use of the improvement disclosed in the following specification.

It is an object of this invention to provide an apron which is affixed to the support by means of a resilient or flexible mounting that it may be displaced rather than deformed by an external force acting upon it.

It is a further object of this invention to provide means whereby the apron after displacement will be immediately returned to its normal position upon removal of the external displacing force.

Another object of this invention is to provide a mounting socket which will facilitate rapid assembly and disassembly of an entire lighting fixture and which will minimize machining operations and the number of parts to be assembled.

In the accompanying drawings.

Like parts are designated by the same reference numerals throughout the several views.

Figure 1:
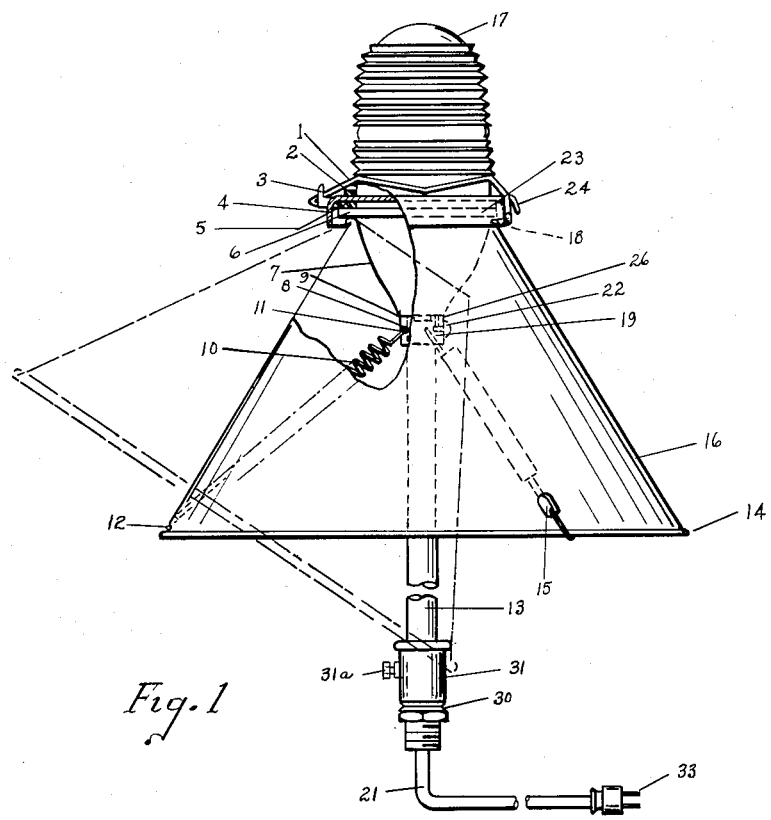
Fig. 1 is a side view of an elevated runway light with a portion broken away, showing the novel swivel marker apron installed thereon.
Figure 3:
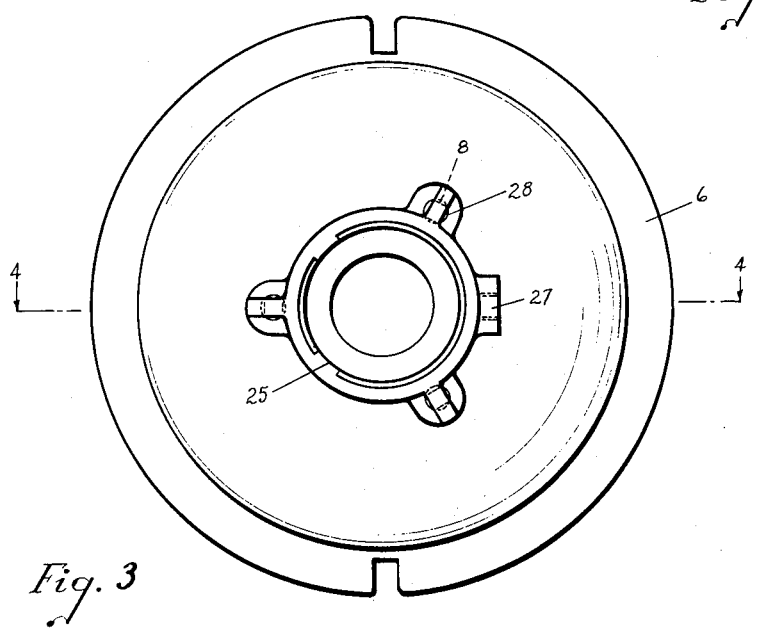
Fig. 3 is a bottom view of a runway light housing.

One specie of runway lighting fixture is depicted in Fig. 1. It comprises a rigid mounting base (not shown) which received a concentrically located break-off adapter 31. The adapter provides a slip socket (not shown) which receives the lower end of the vertically disposed tubular column 13 and a set screw 31a secures the lower end in the socket. The upper end of the tubular column is secured by a set screw 22 within a cored hole or socket 32 in the neck 26 of the lighting fixture housing 7 shown in detail in Figs. 3 and 4. A radially disposed flange 6 at the upper extremity of housing 7 provides a bearing surface for a circular resilient gasket 5 upon its top face. Said gasket maintains a tight seal for the mounting ring 23 which supports a lamp socket (not shown) within the cavity of housing 7. An additional function of the mounting ring 23 is to support a cup-like lens 17 upon a resilient gasket 2 placed between the lens and ring. The lens 17 is tightly held against the gasketed mounting plate by means of a wire hold down spring 1 restrained at its midpoint by passing under a lug 24 on the mounting plate and around each side of the lens in such manner as to create a vertical pressure on the lens flange. An incandescent lamp (not shown) located within the lens 17 is supplied with electrical power by means of a socket (not shown) attached internally to mounting ring 23, said socket being connected to a source of electric power by means of a cable 21 extending from the socket downwardly through a hole 29 in the housing neck 26 and the tubular column 13 and outwardly of the adapter 31, terminating thereafter in attachment plug 33.

Figure 2:
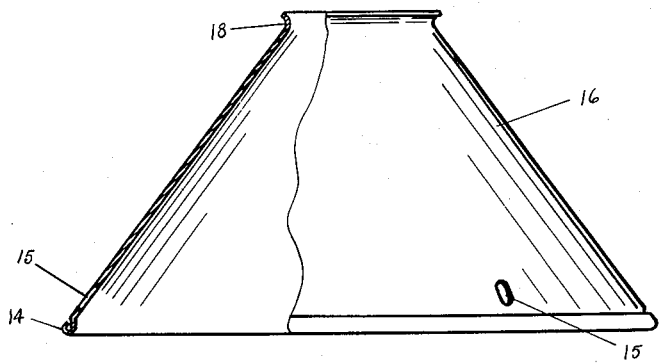
Fig. 2 is a side view of a marker apron partly in section.

Reference to Figs. 1 and 2 discloses an adaptation of the novel swivel marker apron 16. The marker apron is preferably in the form of a truncated cone fabricated from sheet metal with its upper edge 18 arcuately rolled to add strength to the material and serve as a swivel bearing on the flange 6. When in its normal position the marker apron 16 is located concentrically about the housing 7 with its axis substantially coincident with the axis of the column 13. Said apron is urged upward against restraining flange 6 and inward toward the axis of the tubular column 13 by means of springs 10 which are preferably equispaced about the inner periphery of the apron. A plurality of webs 9, disposed vertically, and integrally cast on the housing neck 26, are each provided with a transverse hole 8 for engaging one end 11 of the springs 10. Apron 16 is provided with equispaced elongated holes 15 adjacent to the lower margin to admit the opposite ends 12 of the springs 10 and hold them under tension and thereby support the apron with its upper end engaged with the flange 6 on the housing. The lower edge 14 of apron 16 is rolled without radial protrusion thereby producing a regular conical exterior surface to avoid catching snow, ice and dirt.

When a force having a horizontal component is imparted to apron 16 it swivels on its arcuate edge 18 about the vertical axis of column 13 in the plane of restraining flange 6. This restraining flange is bounded by an annular lip 4 which protrudes downward about the entire outer periphery of mounting ring 23 thereby forming a channel which is circumjacent to the upper edge 18 of apron 16. When the apron has been urged through its maximum arc its motion is limited by being stopped against the vertical supporting column 13 or adapter 31. Upon removal of the external force the apron 16 is restored to its normal position by the action of springs 10. If a force is imparted in excess of that required to swing the apron to its stopping position against the vertical column the entire fixture will break off. This is accomplished by equipping the adapter 31 with an annular groove 30 which weakens the adapter sufficiently to lower its resistance to forces imposed laterally of the column 13. A known breaking point is thereby established in advance.

Reference to Figs. 1, 3, 4, and 5 discloses that the neck portion 26 provides a novel adapter for use in combination with marker apron 16. In effect the housing neck 26 serves as an adapter for securing the upper end of the tubular column 13 to the housing 7 and comprises a cored hole or socket 32 die cast with a double draft within the housing neck 26 and containing two rib-like bearing surfaces 25 which are cast with zero or minimum draft disposed parallel with the vertical axis of the hole 32. Each bearing surface 25 is displaced on the inner periphery of the cored hole 32 equidistant from a plane coincident with the axis of the vertical column 13 and the axis of the tapped hole 27. In effect, an integral internal V-block is formed by the surfaces 25. The vertical tubular column 13 is inserted in the socket 32 and a set screw 22 in tapped hole 27 is turned tight against said column and the column is thus rigidly secured to the housing 7.

Figures 4, 5:
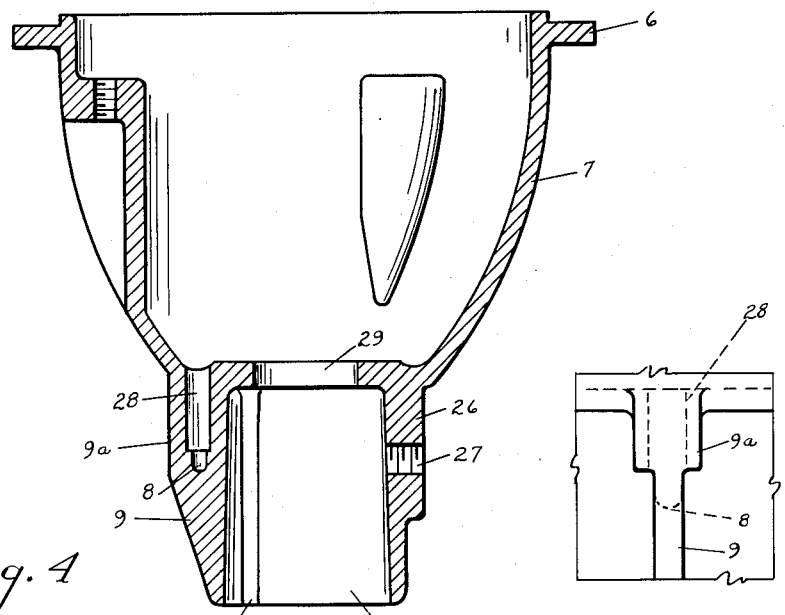
Fig. 4 is a view of the runway light housing taken on section 4—4 of Fig. 3.
Fig. 5 is an enlarged fragmentary view of a portion of the runway light housing neck showing the drain duct and the spring engaging hole in broken lines.

An additional feature incorporated with the neck 26 of the housing resides in ribs or webs 9 each having a transverse hole 8 for the purpose of engaging the upper end of an apron holding spring 10. Reference to Figs. 4 and 5 will disclose a tapered vertically disposed die cast hole 28 within the housing neck 26. Die cast hole 28 passes through the wide upper portion 9a of each web 9 and terminates at its lower end in the narrow portion of the rib in the transverse hole 8. Because the diameter of hole 28 exceeds the width of the narrow section of web 9 a lateral perforation or hole 8 is effected in said web, thereby permitting entry of the hooked end 11 of spring 10 in the hole 8. Hole 8, thus created, serves two purposes, namely, permits gases to be vented and water to be drained from the housing 7.

Although details of adapter 31 shown in Fig. 1 are not illustrated in the drawings it will be readily understood that such may embody an arrangement similar to that provided in the neck 36 of the housing 7.

From the foregoing description it will be seen that damage to the marker apron will be minimized by employment of the new mode of resiliently attaching the self aligning apron to an airport lighting fixture. Frequent replacement of damaged marker aprons will be avoided. In addition, fractures at the frangible annular groove 30 of adapter 31 will be reduced because forces imparted to the swivel apron will now cause it to yield instead of transmitting the force down the rigid tubular column 13, thereby breaking the adapter prematurely as experienced heretofore. Use of the novel socketing arrangement for the column 13 also facilitates manufacturing and assembling of light fixtures because the spring mounting hole 8 is die cast to avoid drilling and because only one set screw is necessary to firmly secure the supporting column within the adapter.

It is claimed:

1. In an elevated airport runway lighting fixture including a light source, a convex housing supporting said light source and having an adapter socket at one end and a radially extending flange at an end remote therefrom, a rigid supporting column extending into said socket, in combination with a self aligning yieldable conical apron arranged to reflect light shed by said light source and having a base margin and a truncated margin, said truncated margin closely surrounding said housing and being normally in continuous bearing relation on said flange, a spring interposed in tension between said housing and the base margin of said apron and at an acute angle with respect to the axis of said column, said spring normally urging said apron against said flange concentrically with said housing, whereupon application of an external force will swivel said apron on a point of its truncated margin bearing on said flange and under lateral restraint by said housing and removal of said force will permit return of said apron to normal position as aforesaid under the action of said spring.

2. The invention according to claim 1 wherein the truncated margin of said apron is arcuately rolled and there are a plurality of equi-angularly spaced springs interposed as aforesaid for returning said apron to normal position after deflection thereof.

3. The invention according to claim 1 including a frangible adapter supporting said column, said frangible adapter being breakable when said apron swivels into contact with said column under the influence of a predetermined force.

References Cited in the file of this patent

UNITED STATES PATENTS

| 1,349,392 | Tillson | Aug. 10, 1920 |
| 1,394,667 | Corbin | Oct. 25, 1921 |
| 1,560,572 | Hatton | Nov. 10, 1925 |
| 1,876,082 | Shaw et al. | Sept. 6, 1932 |
| 2,103,322 | De Sherbinin | Dec. 28, 1937 |
| 2,535,382 | Bachli et al. | Dec. 26, 1950 |
| 2,587,838 | Green | Mar. 4, 1952 |

FOREIGN PATENTS

| 325,634 | Great Britain | Feb. 27, 1930 |